(12) United States Patent
Sasaki et al.

(10) Patent No.: US 9,127,761 B2
(45) Date of Patent: Sep. 8, 2015

(54) GUIDE PLATE FOR SHIFT LEVER DEVICE

(75) Inventors: Naomasa Sasaki, Aichi (JP); Atsushi Toyama, Aichi (JP); Daisuke Yamamoto, Zama (JP); Ryo Saitou, Isehara (JP)

(73) Assignees: KABUSHIKI KAISHA TOKAI RIKA DENKI SEISAKUSHO, Aichi (JP); NISSAN MOTOR CO., LTD., Kanagawa (JP)

( * ) Notice: Subject to any disclaimer, the term of this patent is extended or adjusted under 35 U.S.C. 154(b) by 302 days.

(21) Appl. No.: 13/700,239

(22) PCT Filed: May 27, 2011

(86) PCT No.: PCT/JP2011/062238
§ 371 (c)(1),
(2), (4) Date: Feb. 4, 2013

(87) PCT Pub. No.: WO2011/152313
PCT Pub. Date: Dec. 8, 2011

(65) Prior Publication Data
US 2013/0125692 A1    May 23, 2013

(30) Foreign Application Priority Data
May 31, 2010    (JP) .................................. 2010-124695

(51) Int. Cl.
*F16H 59/02*    (2006.01)
*B60K 20/02*    (2006.01)
(Continued)

(52) U.S. Cl.
CPC ................ *F16H 59/02* (2013.01); *B60K 20/02* (2013.01); *F16H 59/0208* (2013.01);
(Continued)

(58) Field of Classification Search
CPC ..... F16H 59/00; F16H 59/02; F16H 59/0208; F16H 59/105; F16H 61/24; F16H 2059/026; F16H 2061/242; B60K 20/02

USPC ................. 74/473.29, 473.3, 473.33, 473.36, 74/471 XY, 519, 522, 522.5, 523, 526; 192/138; 200/301; 463/38; 188/371, 188/372, 376, 377; 267/159, 163, 165, 182
See application file for complete search history.

(56) References Cited

U.S. PATENT DOCUMENTS 6,568,295 B2 * 5/2003 Matsuno et al. ............. 74/473.3
7,536,972 B2 * 5/2009 Suzuki et al. ................ 116/28.1
(Continued)

FOREIGN PATENT DOCUMENTS

CN    200992147    12/2007
CN    101230907    7/2008
(Continued)

OTHER PUBLICATIONS

English Machine Translation of JP 2002029277 A.*
(Continued)

*Primary Examiner* — William Kelleher
*Assistant Examiner* — Thomas Magnuson
(74) *Attorney, Agent, or Firm* — Greenblum & Bernstein, P.L.C.

(57) ABSTRACT

A guide plate for a shift lever device, which is formed in correspondence with a movement range of a momentary type shift lever that automatically returns to a home position after being operated, is provided with an elastic member that includes an operation hole. The elastic member restricts the movement range of the shift lever and guides movement of the shift lever. An impact absorption mechanism is formed in the elastic member and absorbs impact of the shift lever when the shift lever automatically returns to the home position. The impact absorption mechanism includes a slit arranged proximal to the operation hole. A seat that is capable of absorbing impact of the shift lever is arranged closer to the operation hole than the slit. A stopper arranged at a back side of the seat relative to the slit supports inwardly curved deformation of the seat.

8 Claims, 8 Drawing Sheets

(51) Int. Cl.
*F16H 59/10* (2006.01)
*F16H 61/24* (2006.01)

(52) U.S. Cl.
CPC ............ *F16H 59/105* (2013.01); *F16H 61/24* (2013.01); *F16H 2059/026* (2013.01); *F16H 2061/242* (2013.01); *Y10T 74/20177* (2015.01)

(56) References Cited

U.S. PATENT DOCUMENTS

| | | | |
|---|---|---|---|
| 2007/0137363 A1* | 6/2007 | Aso et al. | 74/473.18 |
| 2008/0083294 A1 | 4/2008 | Gorman et al. | |
| 2009/0174126 A1* | 7/2009 | Takeshima et al. | 267/140.4 |
| 2010/0107798 A1 | 5/2010 | Sickart | |

FOREIGN PATENT DOCUMENTS

| | | |
|---|---|---|
| CN | 101571189 | 11/2009 |
| JP | 61-107024 | 7/1986 |
| JP | 06-344788 | 12/1994 |
| JP | 9-269049 | 10/1997 |
| JP | 2002-029277 | 1/2002 |
| JP | 2002029277 A * | 1/2002 |
| JP | 2004-009903 | 1/2004 |
| JP | 2006-182112 | 7/2006 |
| JP | 2007-223384 | 9/2007 |
| JP | 2010-105622 | 5/2010 |
| JP | 2010-107376 | 5/2010 |

OTHER PUBLICATIONS

English language translation of International Preliminary Report on Patentability for PCT/JP2011/062238.
Japanese Office action, Aug. 13, 2013.
International Search Report dated Jun. 28, 2011 with English language translation.
China Office action, mail date is Dec. 3, 2014.

* cited by examiner

GUIDE PLATE FOR SHIFT LEVER DEVICE

TECHNICAL FIELD

The present invention relates to a guide plate for a shift-by-wire type shift lever device.

BACKGROUND ART

In the prior art, an automatic transmission is installed in an automobile to automatically change gear ratios in accordance with the vehicle speed or engine speed. Such automatic transmission vehicles are popular. Nowadays, as such vehicles, instead of engine vehicles that use an engine as a drive source for vehicle wheels, for example, hybrid vehicles, which use an engine and motor as a drive source, and electric vehicles, which use only a motor as a drive source, and the like are gradually becoming popular.

An automatic transmission vehicle includes a shift lever (selection lever) that is operated when changing the mode of the automatic transmission in accordance with the traveling state (traveling mode). The shift lever can be moved to operation positions mainly corresponding to a parking mode, a neutral mode, a reverse mode, a drive mode, and the like. A hybrid vehicle or electric vehicle may further include an operation position for a regeneration braking mode, which charges the battery with the braking force that the vehicle generates.

In any case, there is a tendency of the so-called shift-by-wire technique being implemented in vehicles to detect the operation position of the shift lever with a sensor and switch the traveling state of the vehicle. Patent document 1 describes a prior art example of a shift-by-wire shift lever device. The shift lever device can be moved in two axial directions, a selection direction and a shift direction. A magnetic sensor detects a magnet arranged on a bottom end of the shift lever to detect the operation position of the shift lever. The shift-by-wire technique detects the position of the shift lever with a magnetic sensor and thus does not require a complicated structure. This simplifies the structure.

In such a shift lever device, for example, a guide groove, which is formed in an upper portion of a housing, guides the movement of the shift lever to each mode position. However, a user may operate the shift lever with excessive force. Thus, to cope with such excessive force, as illustrated in patent document 1, a guide plate including a groove similar to the guide groove is arranged in the housing. This forms a structure that receives excessive operation load with the guide plate.

Patent Document 1: Japanese Laid-Open Patent Publication No. 2007-223384

Patent Document 2: Japanese Laid-Open Patent Publication No. 2004-9903

SUMMARY OF THE INVENTION

There is type of a shift lever device that implements a momentary technique in which when a shift lever is released after being operated, the shift lever automatically returns to an original home position where it was located before being operated. In the momentary technique, when the shift lever returns to the home position after the lever is operated, the shift lever may impact the guide groove or the guide plate. This generates impact noise, and the impact generates vibration. In particular, when the shift lever returns to the home position from the farthest mode position, this problem becomes outstanding.

Patent document 2 describes a guide plate that includes an impact absorption mechanism. The technology of patent document 2 reduces fine vibration generated in the shift lever when the shift lever is moved to a high speed gear but does not absorb the impact produced during the returning movement of the shift lever. Thus, this technology basically does not provide a resolution to the problem. There is a demand for a guide plate that suppresses striking noise, vibration, and the like during the automatic returning of the shift lever. It is also desirable in a stationary type shift lever device that the impact noise and vibration be reduced during lever operation.

Accordingly, it is an object of the present invention to provide a guide plate for a shift lever device that suppresses striking noise, vibration, and the like during movement of the shift lever.

One aspect of the present invention is a guide plate for a shift lever device formed in correspondence with a movement range of a shift lever. The guide plate is provided with an elastic member that includes an operation hole, which restricts the movement range of the shift lever and guides movement of the shift lever. An impact absorption mechanism is formed in the elastic member. The impact absorption mechanism includes a slit arranged proximal to the operation hole, a seat capable of absorbing impact of the shift lever, wherein the seat is arranged closer to the operation hole than the slit, and a stopper arranged at a back side of the seat relative to the slit. The stopper supports inwardly curved deformation of the seat.

DESCRIPTION OF THE EMBODIMENTS

A shift lever device for an electric vehicle according to one embodiment of the present invention will now be described with reference to FIGS. 1 to 9.

Figure 1:
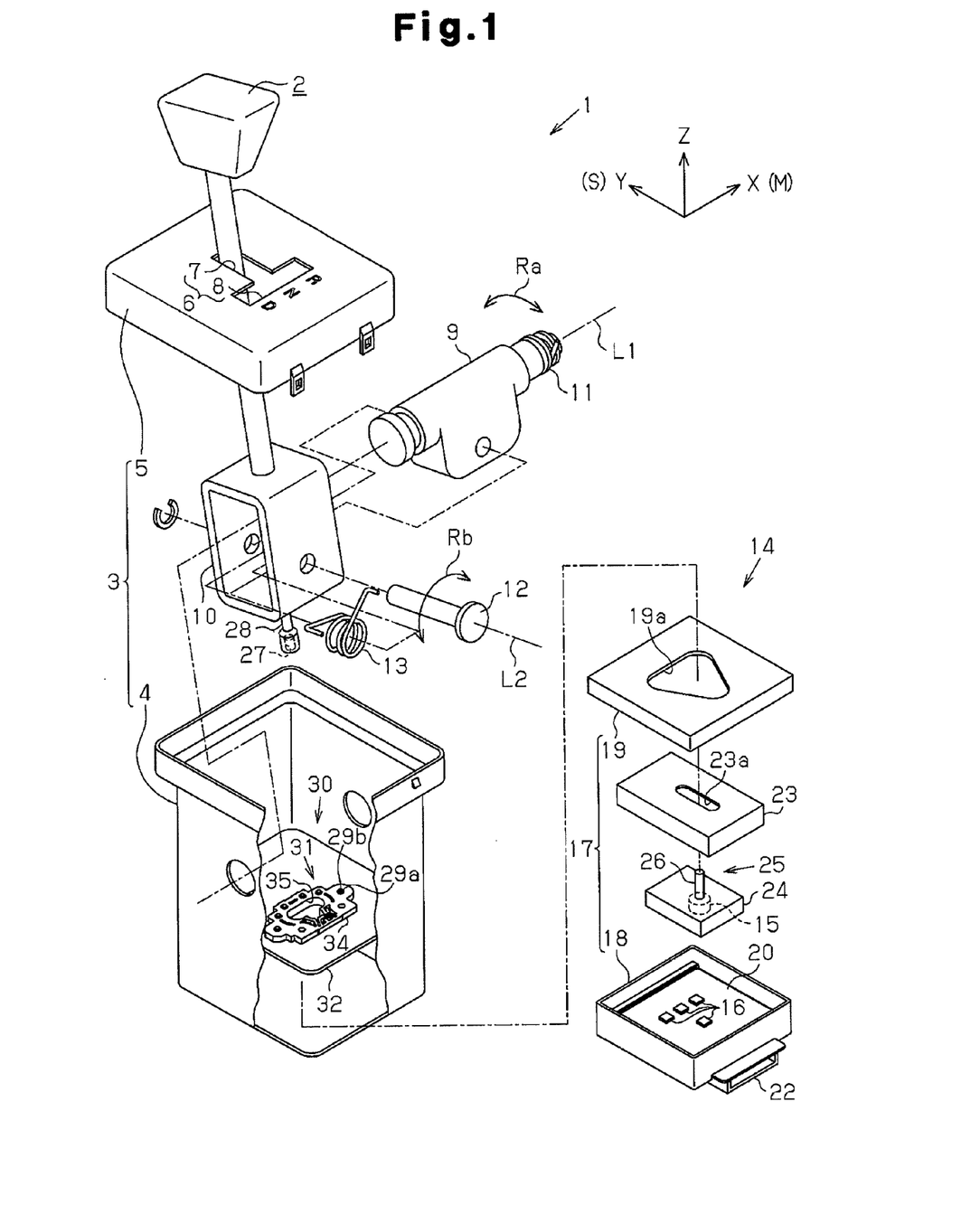
FIG. 1 is a schematic exploded perspective view showing the structure of a shift lever device.

As shown in FIG. 1, an electric vehicle includes a shift lever device 1, which is operated when switching traveling states between forward and backward driving states. The shift lever device 1 of the present example implements the shift-by-wire technique that electrically connects a lever operation type shift lever 2, which is operated when switching mode positions, to a controller (not shown), which switches the traveling state. The shift lever device 1 includes a device case 3 that accommodates the components of the shift lever device 1. The device case 3 is coupled by screws or the like to the vehicle body to secure the shift lever device 1 to the vehicle.

The device case 3 includes a main body 4. The generally rod-shaped shift lever 2 is coupled to the main body 4 in a state allowing for the shift lever 2 to be tilted relative to the device case 3 along the front to rear direction of the vehicle and the widthwise direction of the vehicle. The device case 3 includes an upper panel 5 including a guide hole 6 having the shape of the alphabet "T" that is rotated by 90° clockwise. The shift lever 2 extends out of the device case 3 from the guide hole 6. The guide hole 6 includes a selection hole 7, which extends in a lateral direction of the case 3 (hereafter, referred to as the selection direction S), and a shift hole 8, which is connected to the right end of the selection hole 7 and extends in a perspective direction of the case 3 (hereafter, referred to as the shift direction M).

The shift lever 2 can be arranged at four positions along a hole path of the guide hole 6. The position at which the selection hole 7 and the shift hole 8 intersect is set as a neutral (N) position. One of (upper one in the drawing) the terminal ends of the shift hole 8 is set as a reverse (R) position, and the other one (lower one in the drawing) of the terminal ends of the shift hole 8 is set as a drive (D) position. The shift lever 2 is normally located at an H position. When the shift lever 2 is moved to the R, N, or D position and then released, the shift lever 2 automatically returns to the H position. In this manner, the shift lever 2 is of a momentary type.

A selection shaft 9 is coupled to the device case 3 pivotally (in the direction of arrow Ra) about a first axis L1, which extends in the shift direction M, to allow for the shift lever 2 to tilt in the lateral direction of the device (selection direction S). Further, a selection urging member 11, which applies urging force to the shift lever 2 when the shift lever 2 that is moved in the selection direction S from the H position returns to the original H position, is arranged between the device case 3 and the selection shaft 9. For example, a torsion spring (torsion coil spring) is used as the selection urging member 11.

Further, a lever coupler 10 is coupled, by a hooking pin 12, to the selection shaft 9 pivotally (in the direction of arrow Rb) about a second axis L2, which extends in the selection direction S, to allow for the shift lever 2 to tilt in the perspective direction of the device (shift direction M). Further, a shift urging member 13, which applies urging force to the shift lever 2 when the shift lever 2 that is moved in the shift direction M from the H position returns to the original H position, is arranged between the shift lever 2 and the hooking pin 12. For example, a torsion spring (torsion coil spring) is used as the shift urging member 13.

The device case 3 accommodates a sensor unit 14, which serves as a position detection part for the shift lever 2 in the shift lever device 1. The sensor unit 14 is of a magnetic type and detects the position of a magnet 15, which moves in accordance with the operation of the shift lever 2, with magnetic sensors 16 to detect the operation position of the shift lever 2. The sensor unit 14 includes a box-shaped sensor case 17 that serves as a case portion and accommodates various components of the sensor unit 14. The sensor case 17 includes a lower case 18, which is box-shaped and has an upper opening, and an upper case 19, which closes the opening of the lower case 18 from above. The upper case 19 is coupled and fixed to the lower case 18.

A printed circuit board 20 is fastened by screws (not shown) to the bottom surface of the lower case 18. Various electronic components are mounted on the printed circuit board 20. The printed circuit board 20 includes an upper surface on which the magnetic sensors 16 are mounted as magnetic detection components of the sensor unit 14. For example, magnetic resistance elements (MREs) are used as the magnetic sensors 16, and the magnetic sensors 16 are arranged to detect a plurality of mode positions. The printed circuit board 20 includes a lower surface including a connector 22 that outputs detection signals from the magnetic sensors 16.

The lower case 18, which has an open upper side, accommodates a first slider 23, which permits movement of the shift lever 2 between the R position and the D position (shift direction M) and is linearly movable (slidable) in the perspective direction (X axis direction) of the sensor case 17. The first slider 23 accommodates a second slider 24, which permits movement of the shift lever 2 between the H position and the N position (selection dereliction S) and is linearly movable (slidable) in the widthwise direction (Y axis direction) of the second slider 24.

The upper surface of the first slider 23 includes an oblong opening 23a, which extends in the selection direction S. The upper case 19 includes a triangular opening 19a. A cylindrical joint 26, which is joined with the shift lever 2, projects from the upper surface of the second slider 24. The joint 26 extends out of the opening 23a of the first slider 23 and the opening 19a of the upper case 19. The magnet 15 is attached to the second slider 24. The second slider 24 is movable in the first slider 23 in the selection direction S, and the first slider 23 is movable in the lower case 18 in the shift direction M. As a result, the second slider 24 is movable in the selection direction S and the shift direction M.

The second slider 24 is indirectly coupled to the shift lever 2 by a ball joint mechanism 25 that includes two members, one of which includes a projection fitted into a hole of the other one. In the present example, the joint 26, which is rod-shaped and formed in a central part of the upper surface of the second slider 24, is fitted into a fitting hole 27 in the distal end of the shift lever 2, to couple the shift lever 2 and the second slider 24. When the shift lever 2 is moved in the shift direction M or the selection direction S, the ball joint mechanism 25 functions to convert pivot direction movement of the shift lever 2 into planar direction movement (horizontal direction movement) and thus move the magnet 15.

Further, a guide plate 30 is arranged in the device case 3. The guide plate 30 includes an operation hole 31, which restricts the movement range of the shift lever 2 and guides the shift lever 2. The guide plate 30 is arranged in the main body 4 so that the portion of the shift lever 2 between the lever coupler 10 and the fitting hole 27 is inserted through the operation hole 31. More specifically, the shift lever 2 includes a small diameter portion 28 formed near its basal end. The small diameter portion 28 is inserted through the operation hole 31.

Figure 2:
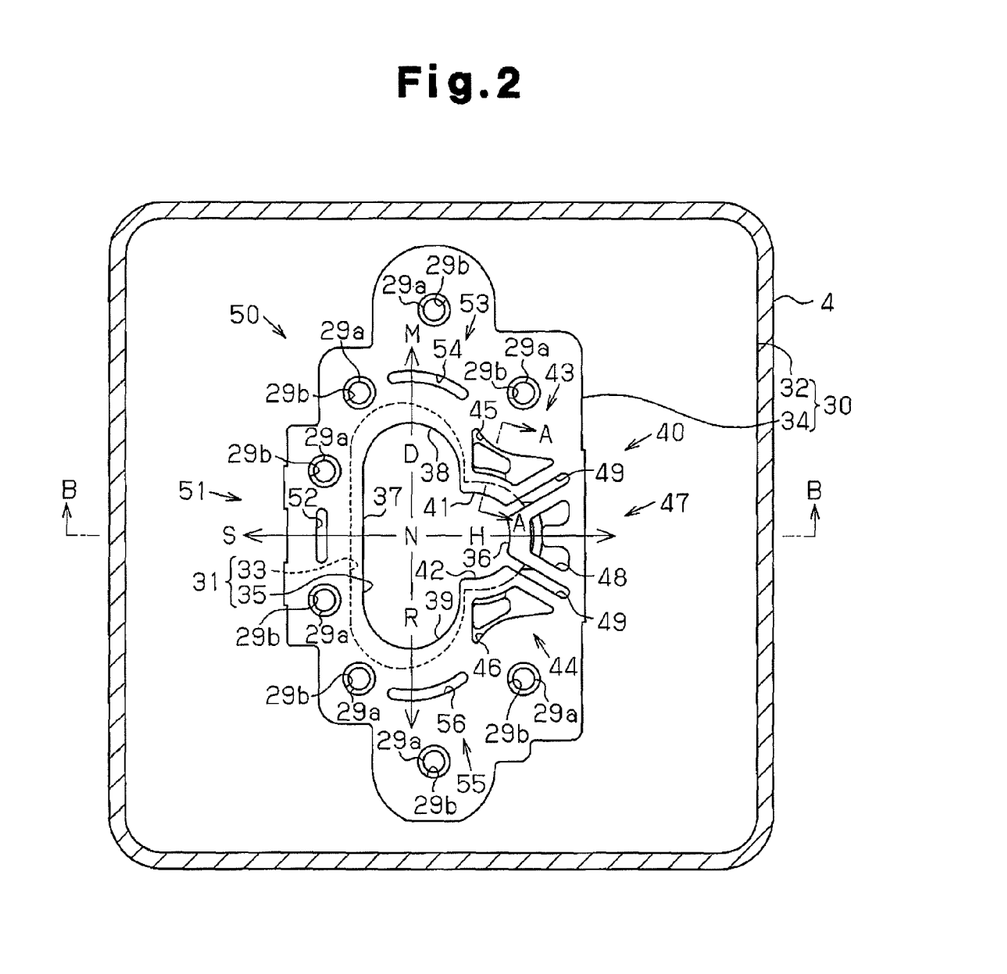
FIG. 2 is a plan view showing a guide plate in the shift lever device.
Figure 3:
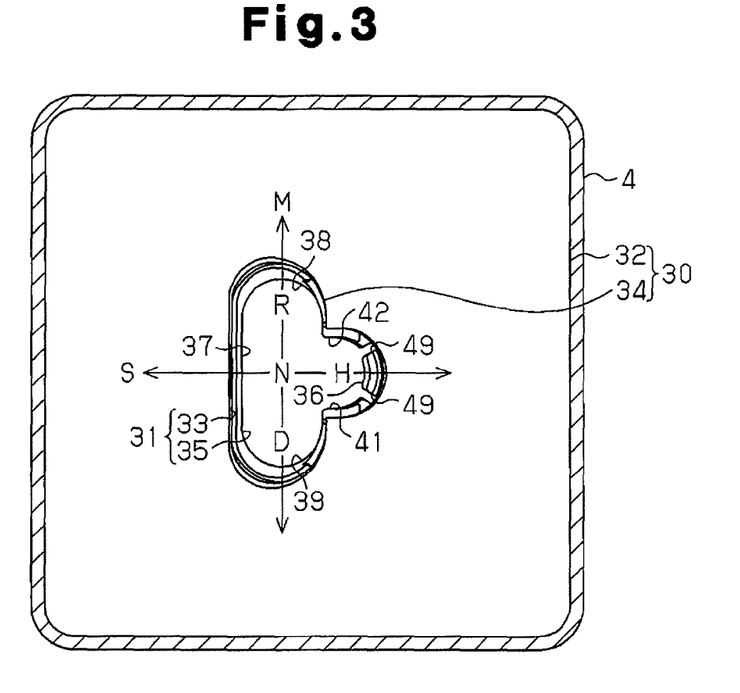
FIG. 3 is a bottom view showing the guide plate in the shift lever device.

As shown in FIGS. 2 and 3, the guide plate 30 includes a support plate 32 extending entirely over the inner surface of the main body 4. The middle of the support plate 32 includes an operation hole 33 having the shape of the alphabet "T" that is rotated by 90° counterclockwise. The support plate 32 is formed integrally with the main body 4 through, for example, insert molding or the like.

An impact buffer 34 is attached to the support plate 32 to serve as an elastic member that absorbs impact of the shift lever 2. The impact buffer 34 includes an operation hole 35 having the shape of the alphabet "T" that is rotated by 90° counterclockwise. The impact buffer 34 can be expanded and contracted and is formed separately from the main body 4. A plurality of holding pins 29a, which are formed on the upper surface of the support plate 32, are hooked to hooking holes 29b, which are formed in the impact buffer 34, to fix the impact buffer 34 to the support plate 32. The impact buffer 34 is shaped to cover the operation hole 33 of the support plate 32. When the shift lever 2 is operated, the impact buffer 34 prevents the shift lever 2 from directly hitting the support plate 32 and absorbs the impact of the shift lever 2.

The operation hole 31 of the guide plate 30 includes the operation hole 33 of the support plate 32 and the operation hole 35 of the impact buffer 34. The guide hole 6 of the upper panel 5 and the operation hole 35 of the impact buffer 34 are point-symmetric about an intersection point of the L1 axis and the L2 axis. Thus, the H position is set at a position reversed from the N position, and the D position is set at a position reversed from the R position.

Figure 4:
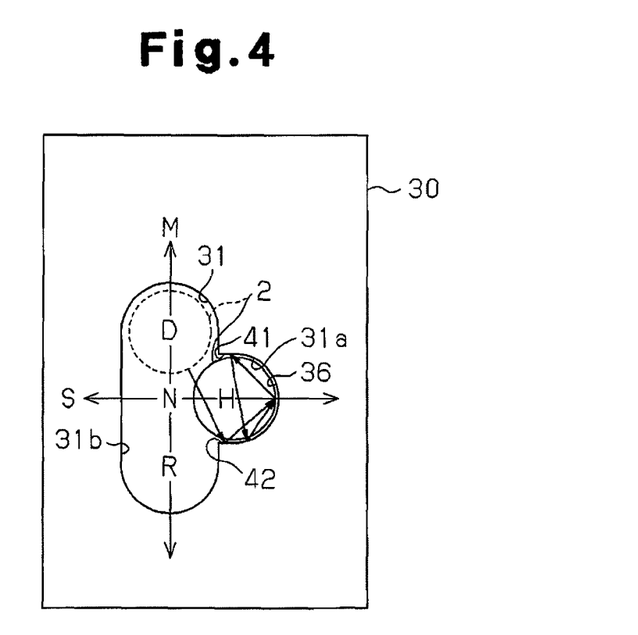
FIG. 4 is a diagram showing a movement path of a shift lever in the guide plate.

After the shift lever 2 is moved from the H position to another shift lever position, by releasing the shift lever 2, the momentary function automatically returns the shift lever 2 to the original H position. As shown in FIG. 4, when returning from the farthest mode position (D position and R position) to the H position, the shift lever 2 impacts (primary impact) a corner 41 (42) in the operation hole 31 of the guide plate 30 where a selection operation hole 31a, which extends in the selection direction S, connects with a shift operation hole 31b, which extends in the shift direction M. Then, the shift lever 2 impacts (secondary impact) an H opposing edge 36, which is the terminal end of the selection operation hole 31a. Afterward, the shift lever 2 bounces on the inner wall of the selection operation hole 31a as it converges at the H position. Thus, when the impact is too strong, the striking noise, vibration, and the like becomes a problem.

In the present example, as shown in FIG. 2, the impact buffer 34 includes a lever return buffer mechanism 40, which absorbs impact when the shift lever 2 is returned to the H position by the momentary function. In this case, two primary impact absorbers 43 and 44, which absorb the primary impact, are arranged at the corners 41 and 42 of the impact buffer 34. The primary impact absorbers 43 includes a trapezoidal intersecting slit 45 at the corner 41, and the other primary impact absorber 44 includes a trapezoidal intersecting slit 46 at the corner 42. The primary impact absorbers 43 and 44 function as an impact absorption mechanism and a sub-impact absorption mechanism.

Figure 5:
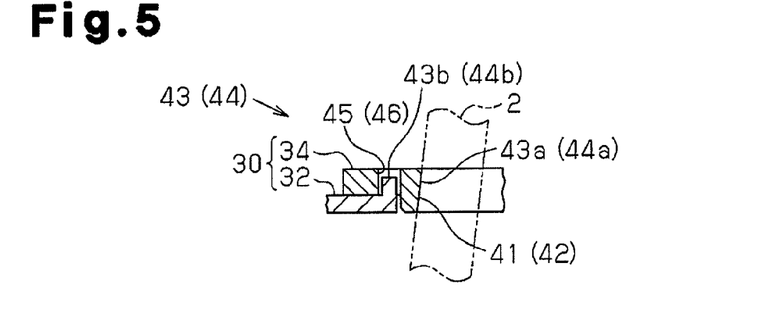
FIG. 5 is a cross-sectional view taken along line A-A showing the guide plate in the shift lever device.

As shown in FIG. 5, the primary impact absorber 43 includes a flange-shaped seat 43a, which receives the shift lever 2 that returns to the H mode, and a stopper 43b, which supports the seat 43a that is deformed in an inwardly curved manner during impact of the shift lever 2. The seat 43a is generally trapezoidal as viewed from above. The stopper 43b is formed integrally with the support plate 32 and extends into the intersecting slit 45. The stopper 43b prevents the seat 43a, when inwardly curved and deformed, from deforming in an inwardly curved manner more than necessary. Further, in the same manner as the primary impact absorber 43, the primary impact absorber 44 includes a seat 44a and a stopper 44b.

As shown in FIG. 2, the H opposing edge 36, which corresponds to the H position in the impact buffer 34, includes a secondary impact absorber 47, which absorbs the secondary impact. The secondary impact absorber 47 functions as an impact absorption mechanism and a main impact absorption mechanism. The secondary impact absorber 47 includes a U-shaped slit 48, which extends through the H opposing edge 36.

Figure 6:
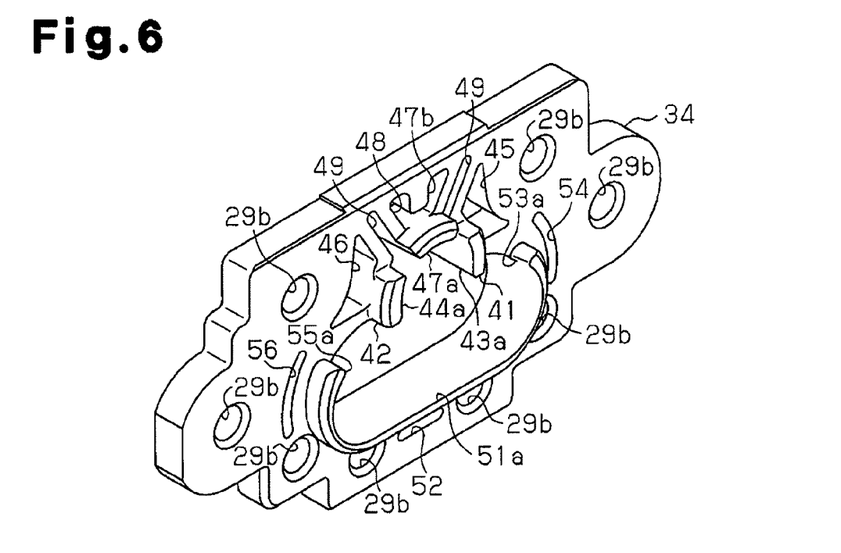
FIG. 6 is a perspective view showing a lower surface side of the guide plate in the shift lever device.
Figure 7:
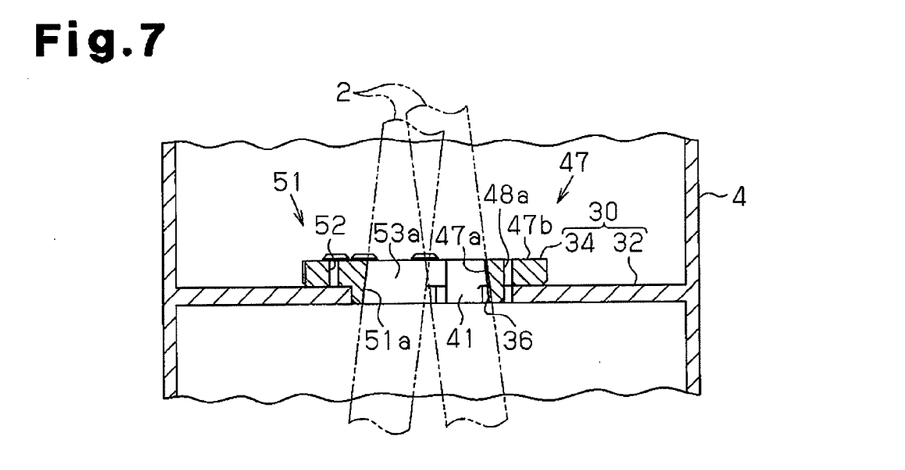
FIG. 7 is a cross-sectional view taken along line B-B showing the guide plate in the shift lever device.
Figure 8:
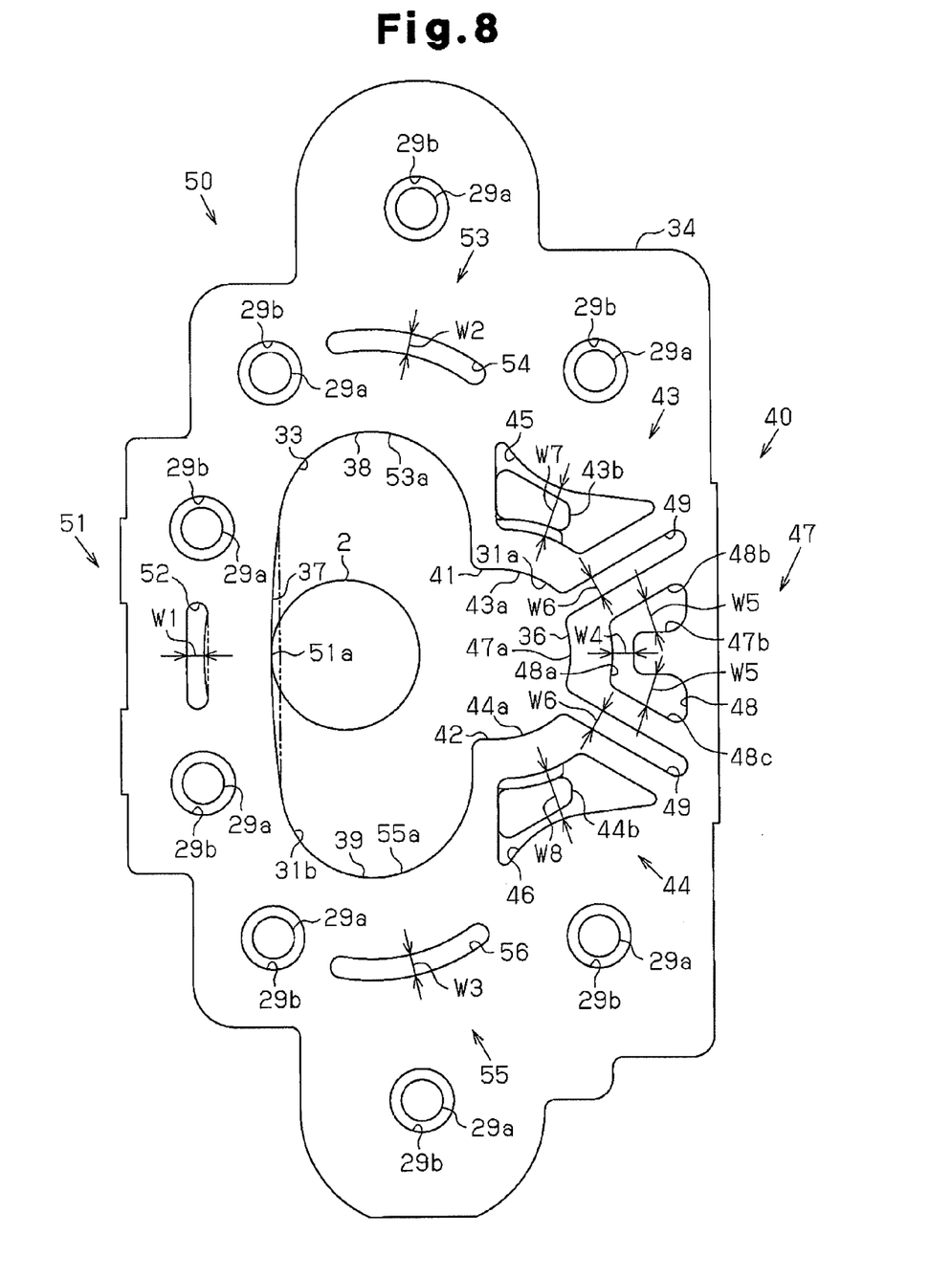
FIG. 8 is a plan view showing the guide plate of the shift lever device in a state in which the shift lever strikes an opposing edge of the guide plate when moving to a neutral position.

As shown in FIG. 8, the U-shaped slit 48 includes a U-shaped parallel slit 48a, which extends parallel to the H opposing edge 36, and U-shaped orthogonal slits 48b and 48c, which are respectively connected to the two ends of the U-shaped parallel slit 48a and orthogonal to the H opposing edge 36. As shown in FIGS. 6 and 7, in the same manner as the primary impact absorbers 43 and 44, the secondary impact absorber 47 includes a seat 47a and a stopper 47b. The stopper 47b of the present example is formed integrally with the impact buffer 34 and is a projection that projects into the U-shaped slit 48.

Further, the H opposing edge 36 includes two orthogonal slits 49 and 49 that extend continuously from the operation hole 35 at the outer sides of the U-shaped orthogonal slits 48b and 48c. The orthogonal slits 49 and 49 are arranged between the intersecting slits 45 and 46 and the U-shaped slit 48 and extend parallel to the U-shaped orthogonal slits 48b and 48c. The orthogonal slits 49 and 49 are grooves that enhance absorption of the primary impact and the secondary impact.

The impact buffer 34 includes a lever operation buffer mechanism 50 that absorbs an impact when the shift lever 2 is fully moved to a mode position other than the H position. In this case, an N opposing edge 37 corresponding to the N position in the impact buffer 34 includes a first operation load absorber 51, which absorbs the operation load applied to the inner wall of the operation hole 31 when the shift lever 2 is moved to the N position. A parallel slit 52 extends through the first operation load absorber 51 for a predetermined amount along the shift direction M. The first operation load absorber 51 also includes a seat 51a similar to those of the primary impact absorbers 43 and 44.

The impact buffer 34 includes a D opposing edge 38 corresponding to the D position. A parallel slit 54, which extends along the selection direction S, extends through the D opposing edge 38 to form a second operation load absorber 53, which is similar to the first operation load absorber 51. Further, the impact buffer 34 includes an R opposing edge 39 corresponding to the R position. A parallel slit 56, which extends along the selection direction S, extends through the R opposing edge 39 to form a third operation load absorber 55 in the same manner. The operation load absorbers 53 and 55 also include seats 53a and 55a in the same manner.

As shown in FIG. 8, gaps W7 and W8 of the intersecting slits 45 and 46 are larger than gaps W1, W2, and W3 of the parallel slits 52, 54, and 56. Further, a gap W4 of the U-shaped parallel slit 48a, a gap W5 of the U-shaped orthogonal slits 48b and 48c, and a gap W6 of the orthogonal slits 49 and 49 are smaller than the gaps W7 and W8 but larger than the gaps W1 to W3. The gaps W1 to W3 are formed at relatively small intervals.

When the shift lever 2 is moved from the H position to the D position and the shift lever 2 is moved by a maximum amount in the selection direction S, the shift lever 2 contacts the N opposing edge 37. In this case, as shown in FIG. 8, the first operation load absorber 51 of the N opposing edge 37 functions to absorb the impact. More specifically, the shift lever 2 pushes and deforms the seat 51a in an inwardly curved manner, and the gap W1 of the parallel slit 52 is narrowed and deformed. This absorbs the impact of the shift lever 2.

Figure 9A:
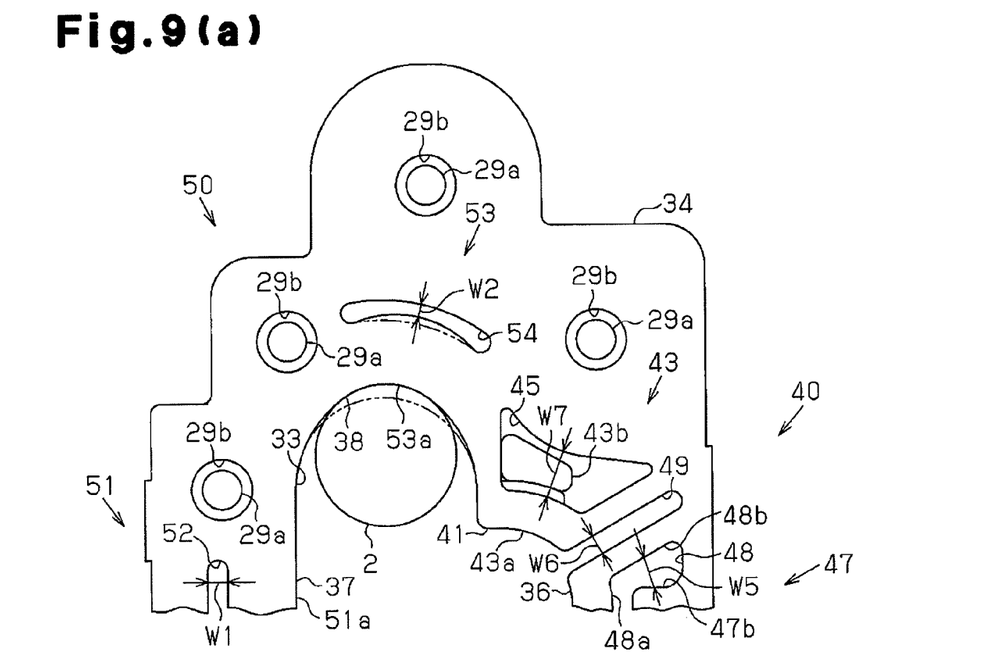
FIG. 9(a) is a plan view showing the guide plate of the shift lever device in a state in which the shift lever strikes an opposing edge of the guide plate when moving to a drive position.
Figure 9B:
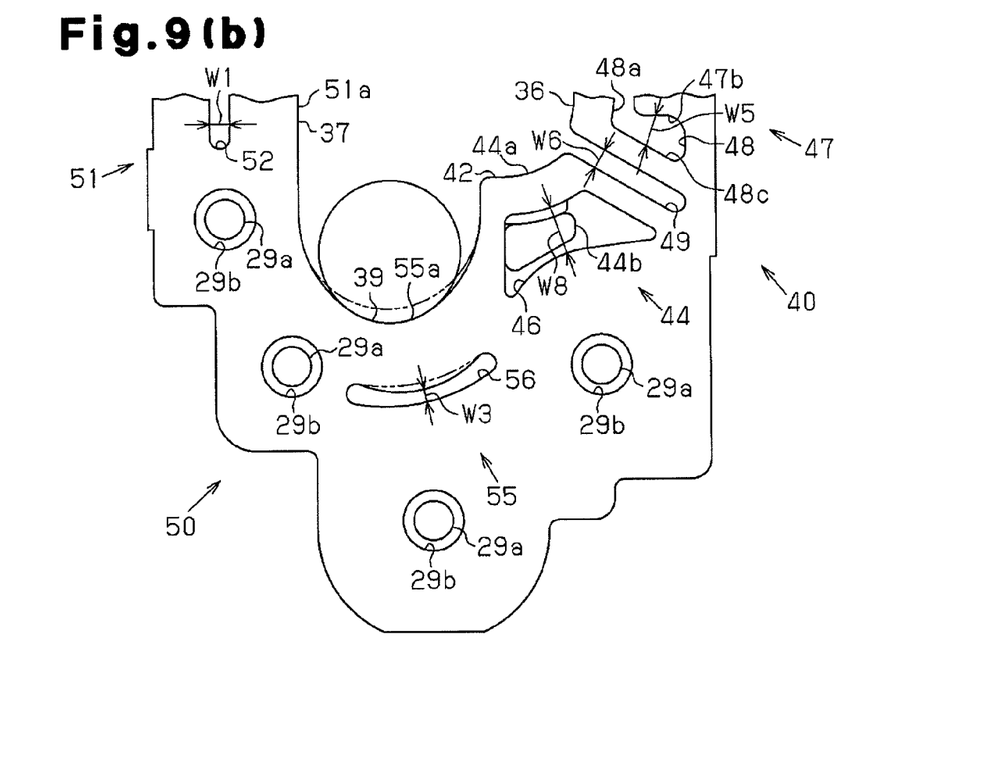
FIG. 9(b) is a plan view showing the guide plate of the shift lever device in a state in which the shift lever strikes an opposing edge of the guide plate when moving to a reverse position.

Then, when the shift lever 2 at the N position is moved to the D position by a maximum amount, the shift lever 2 contacts the D opposing edge 38. In this case, as shown in FIG. 9(a), the second operation load absorber 53 of the D opposing edge 38 functions to absorb the impact. More specifically, the shift lever 2 pushes and deforms the seat 53a in an inwardly curved manner, and the gap W2 of the parallel slit 54 is narrowed and deformed. This absorbs the impact of the shift lever 2. When the shift lever 2 is moved to the R position, as shown in FIG. 9(b), the third operation load absorber 55 of the R opposing edge 39 functions to absorb impact in the same manner. More specifically, the shift lever 2 pushes and deforms the seat 55a in an inwardly curved manner, and the gap W3 of the parallel slit 56 is narrowed and deformed. This absorbs the impact of the shift lever 2.

After the shift lever 2 is moved to the D position and the shift lever 2 is released, the momentary function starts to return the shift lever 2 to the H position. In this case, the shift lever 2 moves diagonally and comes into contact with the corner 42 of the impact buffer 34. In the present example, the primary impact absorber 44 is located at the corner 42. Thus, the primary impact absorber 44 functions to absorb the primary impact. More specifically, the shift lever 2 pushes and deforms the seat 44a in an inwardly curved manner, and the gap W8 of the intersecting slit 46 is narrowed and deformed. This absorbs the impact of the shift lever 2.

In this state, when the seat 44a is greatly deformed in an inwardly curved manner, the seat 44a comes into contact with the stopper 44b. In this manner, part of the support plate 32, which has a high rigidity, forms the stopper 44b at where the seat 44a is inwardly curved. Thus, even when the seat 44a is inwardly curved such that the gap W8 becomes extremely narrow, the stopper 44b restricts the position of the seat 44a. This restricts further movement, and the seat 44a is not deformed in an inwardly curved manner more than necessary.

Figure 10A:
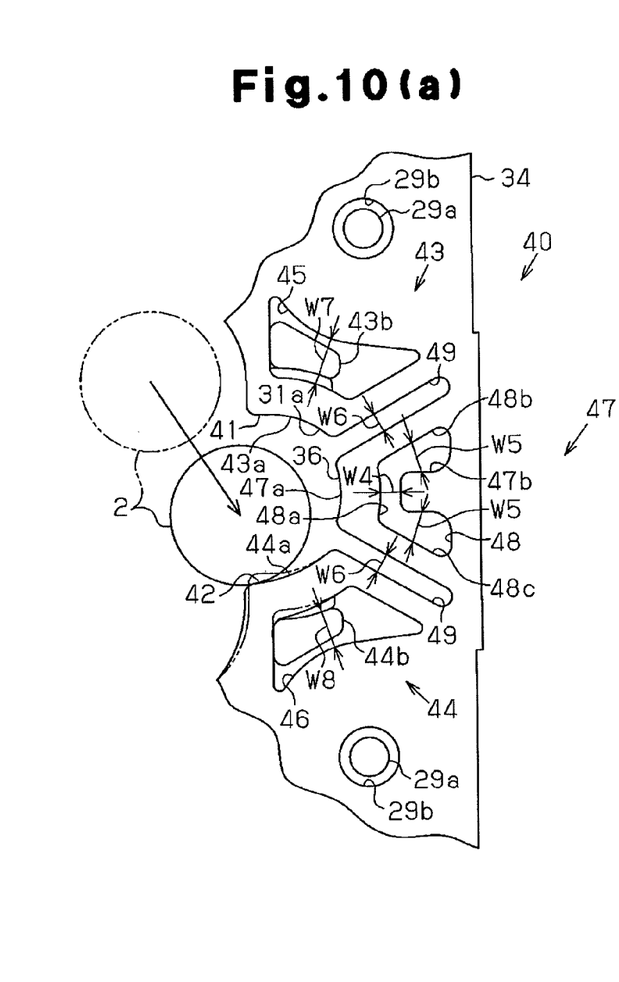
FIGS. 10(a) and 10(b) are enlarged plan views showing the guide plate of the shift lever device in a state in which the shift lever strikes an intersection of the guide plate when moving to a home position.
Figure 10B:
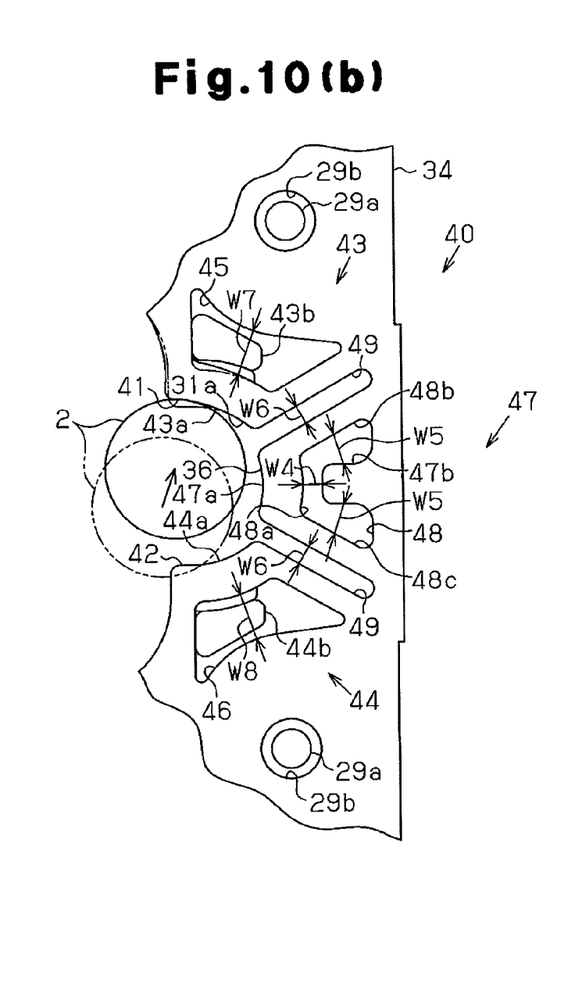

After contacting the corner 42, as shown in FIG. 10(b), the shift lever 2 bounces in the selection operation hole 31a and moves toward the H position. In this state, the two primary impact absorbers 43 and 44 alternately function to absorb the impact of the shift lever 2.

Figure 11:
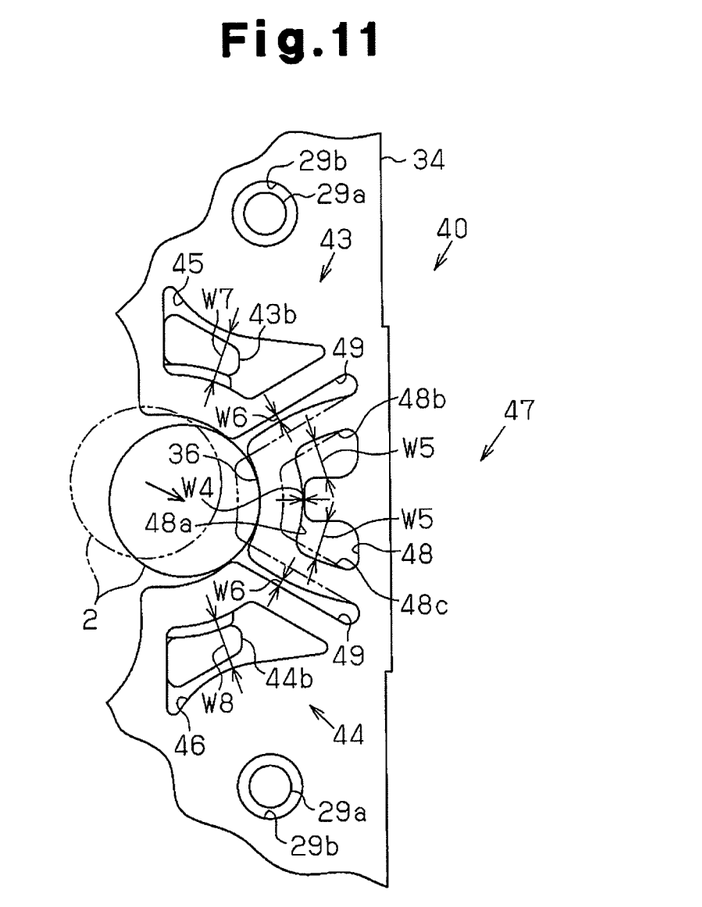
FIG. 11 is an enlarged plan view showing the guide plate of the shift lever device in a state in which the shift lever strikes an opposing edge of the guide plate when moving to the home position.

Then, when the shift lever 2 is moved by a maximum amount in the selection direction S, the shift lever 2 contacts the H opposing edge 36. In this case, as shown in FIG. 11, the secondary impact absorber 47 of the H opposing edge 36 functions to absorb impact. More specifically, when the gap W4 of the U-shaped parallel slit 48a is narrowed and deformed, the gaps W5 and W5 of the U-shaped orthogonal slits 48b and 48c and the gaps W6 and W6 of the orthogonal slits 49 and 49 are narrowed and deformed. This absorbs the impact of the shift lever 2. When the impact is canceled, the shift lever 2 is held at the H position.

As described above, the present example uses the lever return buffer mechanism 40, which includes the slits 48 and 49 in the guide plate 30 of the shift lever 2. Thus, even when the shift lever 2 automatically returns from the D position or R position to the H position and impacts the operation hole 31, the seats 43a, 44a, and 47a of the lever return buffer mechanism 40 absorb the impact. This suppresses operation noise and vibration when the shift lever 2 returns. Further, the guide plate 30 includes the lever operation buffer mechanism 50. This reduces the striking noise produced when the shift lever 2 is further moved to each mode position.

Further, the primary impact absorber 43 and 44 and the secondary impact absorber 47 includes the stoppers 43b and 44b at where the seats 43a, 44a, and 47a, which receive the shift lever 2, are curved inwardly. Thus, when the seats 43a, 44a, and 47a are curved inwardly by a large amount, the stoppers 43b, 44b, and 47b restrict further inwardly curved deformation. As a result, even with the structure that absorbs impact of the shift lever with the inwardly curved deformation of the seats 43a, 44a, and 47a, when the seats 43a, 44a, and 47a are curved inwardly and deformed by a large amount, the stoppers 43b, 44b, and 47b restrict the positions of the seats 43a, 44a, and 47a. Hence, the seats 43a, 44a, and 47a do not inwardly curve and deform more than necessary.

The embodiment described above has the following advantages.

(1) The guide plate 30 includes the lever return buffer mechanism 40. Thus, the shift lever 2 further efficiently absorbs the impact produced as the shift lever 2 strikes the guide plate 30 when the momentary function automatically returns the shift lever 2 to the H position. This further suppresses the striking noise and vibration to a low level when the shift lever 2 returns to the H position.

(2) When the shift lever 2 is of a momentary type, as the shift lever 2 automatically returns to the shift lever 2, the shift lever 2 strikes the corners 41 and 42. However, in the present embodiment, the primary impact absorbers 43 and 44 absorb the impact. Then, the secondary impact absorber 47 absorbs the impact. This ensures that the impact of the shift lever 2 is absorbed.

(3) The stoppers 43b and 44b of the primary impact absorbers 43 and 44 are formed by part of the support plate 32. This ensures that the inward curving of the seats 43a and 44a is received. Thus, the seats 43a and 44a are not inwardly curved and deformed more than necessary. This efficiently absorbs the impact of the shift lever 2. Further, the position of the impact buffer 34 relative to the support plate 32 can be maintained.

(4) The stopper 47b of the secondary impact absorber 47 is formed by part of the impact buffer 34. Thus, the positional relationship of the seats 43a and 44a and the stoppers 43b and 44b is not affected by the component coupling accuracy.

(5) The impact buffer 34 covers the operation hole 33 of the support plate 32. Thus, when the shift lever 2 impacts the impact buffer 34, separation of the impact buffer 34 from the support plate 32 is suppressed.

(6) In the momentary type shift lever device 1, since the shift lever 2 impacts the guide plate 30 whenever returning to the H position, the arrangement of the lever return buffer mechanism 40 in the shift lever device 1 of the present example has an extremely large effect.

(7) The seats 43a, 44a, and 47a are flange-shaped and projected by a predetermined amount from the operation hole 33. Thus, when the shift lever 2 moves, the shift lever 2 impacts the impact buffer 34, which projects into the operation hole 33 of the support plate 32. As a result, impact is not transmitted to the support plate 32, which is integral with the main body 4, and the impact of the shift lever 2 is absorbed in an ensured manner.

The above embodiment may be modified to the forms described below.

In the above embodiment, the secondary impact absorber 47 is arranged at only the H position. However, a secondary impact absorber may be arranged at each of the N position, D position, and R position.

The above embodiment uses the stopper 47b, which is formed by part of the impact buffer 34, and the stoppers 43b and 44b, which are formed by parts of the support plate 32. However, when a plurality of impact absorbers are used, either one type of these stoppers may be used. Alternatively, a combination of the impact absorbers may be used.

In the above embodiment, the primary impact absorbers 43 and 44 are arranged at the corners 41 and 42. However, as long as impacts can be absorbed by only the secondary impact absorber 47, the primary impact absorbers 43 and 44 may be omitted. Alternatively, the secondary impact absorber 47 is omitted and only the primary impact absorbers 43 and 44 may be used.

In the above embodiment, the orthogonal slits 49 are arranged at the left and right sides of the U-shaped slit 48. However, as long as impacts can be absorbed by only the U-shaped slit 48, the orthogonal slit 49 may be omitted.

In the above embodiment, the impact buffer 34 covers the opposing edges 36 to 39 of the support plate 32 but does not have to do so as long as separation of the impact buffer 34 can be prevented.

In the above embodiment, the guide plate 30 includes the support plate 32 and the impact buffer 34. However, the guide plate 30 may be formed by a single member that is elastically deformable and includes parallel slits and vertical slits.

In the above embodiment, the shift lever device 1 does not have to be formed such that the lever movement direction has the shape of the English alphabet "T" that is rotated by 90° clockwise. For example, the lever movement direction may have the shape of upper case "H" or lower case "h" rotated in the left or right directions.

The above embodiment is applied to the momentary type shift lever device but may be another type of a shift lever device, such as a stationary type.

In the above embodiment, the seats 43a, 44a, and 47a do not have to be trapezoidal and may have various shapes, such as a triangle shape, a tetragonal shape, or an arcuate shape.

In the above embodiment, the slits do not have to be trapezoidal and U-shaped. For example, the slits may be undulated or saw-teeth-shaped.

In the above embodiment, the orthogonal slits 49 do no have to be groove-shaped and may be, for example, a hole.

In the above embodiment, the shift lever device 1 does not have to be used in a vehicle and is applicable to other machines or apparatuses.

The invention claimed is:

1. A guide plate for a shift lever device, the guide plate comprising:
   an elastic member that includes an operation hole, which restricts a movement range of a shift lever that automatically returns to a home position after being operated and guides movement of the shift lever;
   a support plate that supports the elastic member; and
   an impact absorption mechanism for absorbing impact of the shift lever when the shift lever automatically returns to the home position, wherein the impact absorption mechanism includes
      a slit formed in the elastic member and arranged proximal to the operation hole,
      a seat capable of absorbing impact of the shift lever, wherein the seat is arranged closer to the operation hole than the slit, and
      a stopper extending into the slit, wherein the stopper is formed by extending part of the support plate into the slit so as to support inwardly curved deformation of the seat.

2. The guide plate for a shift lever device according to claim 1, wherein
   the impact absorption mechanism is one of a plurality of impact absorption mechanisms in the guide plate, the plurality of impact absorption mechanisms including
      a main impact absorption mechanism, which is located in correspondence with a mode position of the shift lever, and
      a sub-impact absorption mechanism, which is arranged in a path to the mode position.

3. The guide plate for a shift lever device according to claim 1, further comprising
   a second impact absorption mechanism for absorbing impact of the shift lever when the shift lever automatically returns to the home position, wherein the second impact absorption mechanism includes
      a second slit formed in the elastic member and arranged proximal to the operation hole,
      a second seat capable of absorbing impact of the shift lever, wherein the second seat is arranged closer to the operation hole than the second slit, and
      a second stopper that is an inward projection of the elastic member defining the second slit.

4. The guide plate for a shift lever device according to claim 1, wherein the seat projects toward the operation hole of the elastic member from an operation hole formed in the support plate to cover an inner wall of the operation hole of the support plate.

5. The guide plate for a shift lever device according to claim 2, wherein the elastic member further includes a groove formed between the main impact absorption mechanism and the sub-impact absorption mechanism to enhance impact absorption of the shift lever.

6. The guide plate for a shift lever device according to claim 3, wherein the second slit is a U-shaped slit including a parallel slit, which extends parallel to an edge of the operation hole, and an orthogonal slit, which is connected to two ends of the parallel slit orthogonal to the edge.

7. The guide plate for a shift lever device according to claim 1, wherein the operation hole of the elastic member projects inward from an operation hole formed in the support plate.

8. A guide plate for a shift lever device, the guide plate comprising
   an elastic member that includes an operation hole, which restricts a movement range of a shift lever that automatically returns to a home position after being operated and guides movement of the shift lever;
   a support plate that supports the elastic member; and
   an impact absorption mechanism for absorbing impact of the shift lever when the shift lever automatically returns to the home position, wherein the impact absorption mechanism includes
      a slit formed in the elastic member and arranged proximal to the operation hole,
      a seat capable of absorbing impact of the shift lever, wherein the seat is arranged closer
   to the operation hole than the slit, and
      a stopper extending into the slit to support inwardly curved deformation of the seat,
   wherein the seat is formed as a flange, and when the shift lever impacts the seat, the flange comes into contact with the periphery of the support plate and restricts the position of the shift lever.

* * * * *